United States Patent Office 2,755,778
Patented July 24, 1956

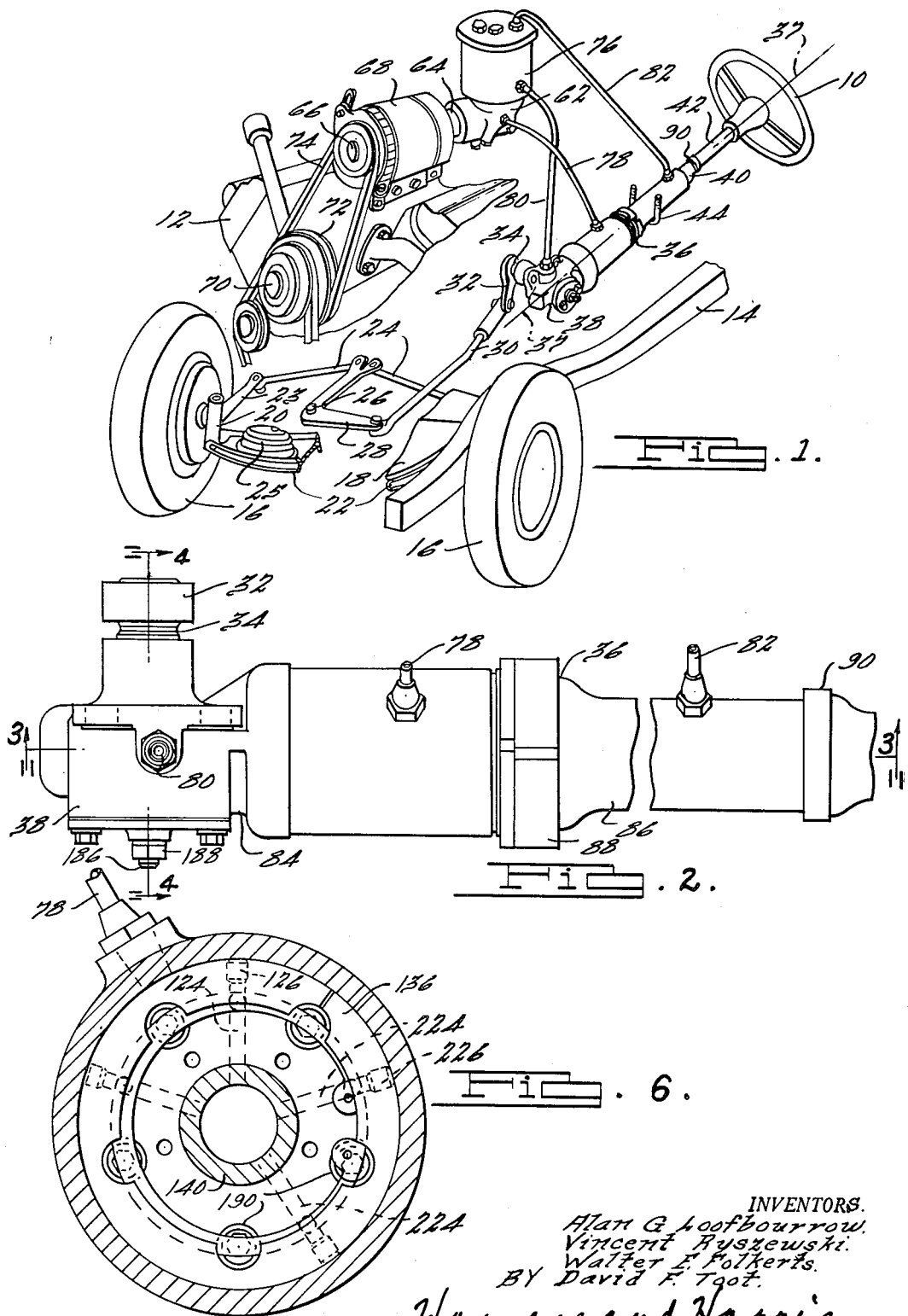

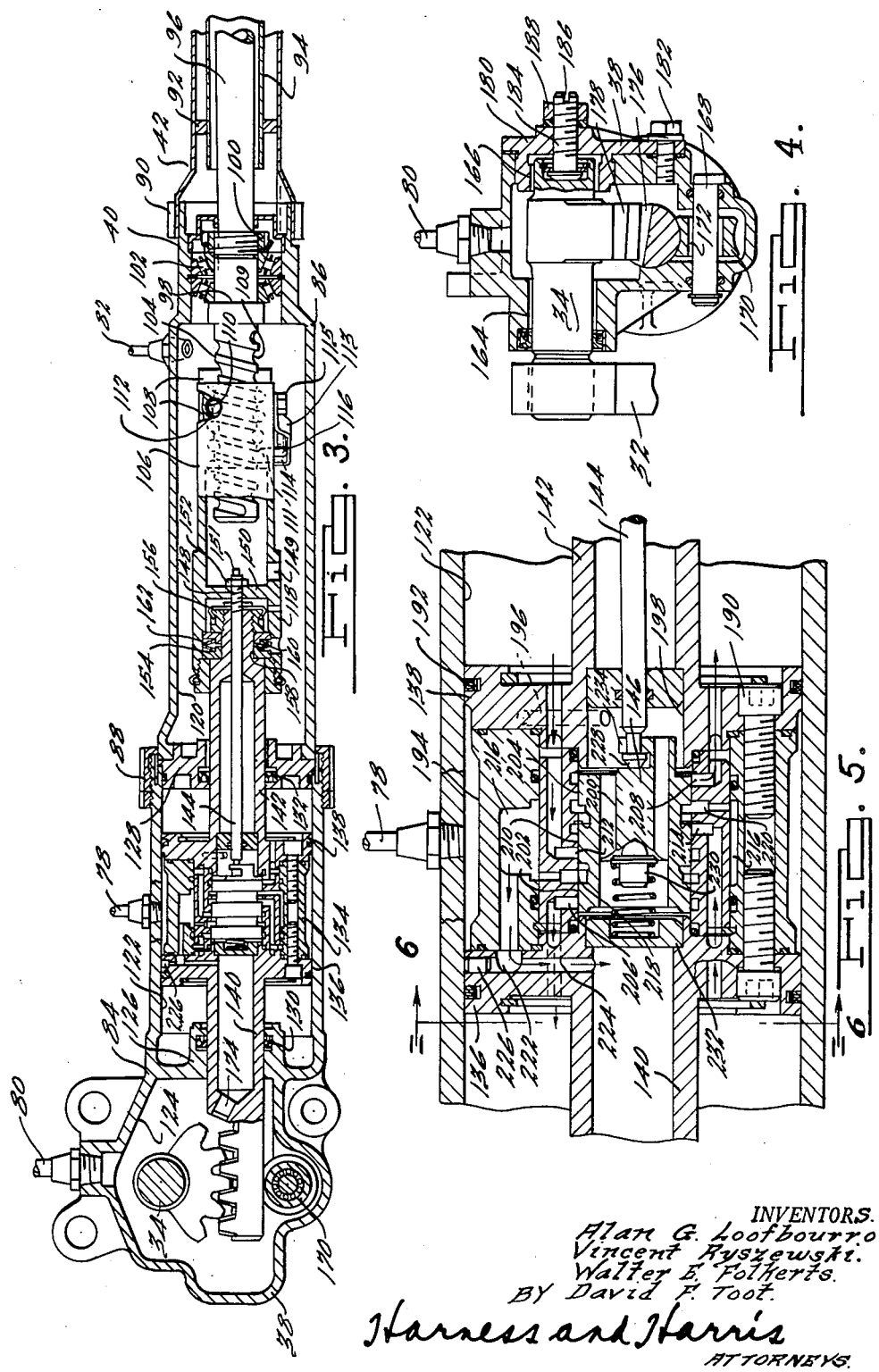

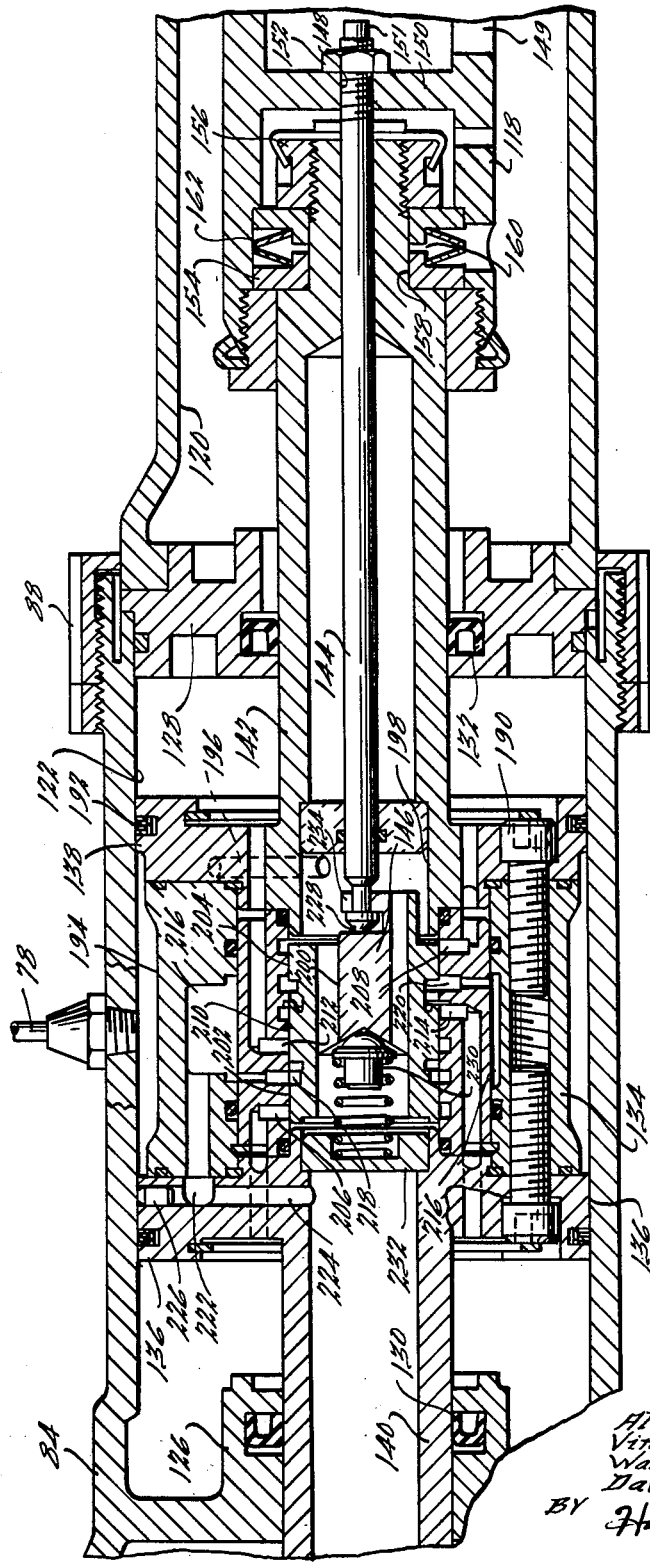

2,755,778

POWER STEERING UNIT

Alan G. Loofbourrow, Birmingham, Vincent Ryszewski, Detroit, Walter E. Folkerts, Hazel Park, and David F. Toot, Huntington Woods, Mich., assignors to Chrysler Corporation, Highland Park, Mich., a corporation of Delaware Application April 18, 1952, Serial No. 283,106

6 Claims. (Cl. 121—41)

This application relates to a power steering unit for automotive and other vehicles of the type normally incorporating a steering column structure therein, and particularly relates to a power steering unit which is concentric with the steering column and combines and blends therewith to produce unitary construction and appearance.

The components for conventional power steering mechanisms are ordinarily looked on as including a means for circulating pressure fluid such as oil, glycerine or the like through the rest of the components which are arranged in series and include a reservoir, a power cylinder or motor which actuates the steering mechanism, and distributing means usually in the form of a control valve for discriminately applying the fluid pressure to the power cylinder to actuate the steering mechanism. The pressure fluid from the steering mechanism is preferably returned to the reservoir for re-circulation. Power steering mechanisms generally and, particularly the unitary type of steering mechanism such as the one hereinafter described, are preferably of the open valve type, that is to say, so constructed that when the mechanism is idle there is free passage therethrough for the pressure fluid, that is, free passage at least through the distributing means above such that the pump works only under a sufficient load to overcome the fluid friction of the pressure fluid in the pipes and passages through which it circulates. Thus practically all of the energy output of the useful fluid delivered by the pump is converted into useful work of steering when steering is being done and further, no energy is wasted in overcoming the back pressure set up by a relief valve when the steering mechanism is idle. In the unitary steering mechanism such as that to be described, the open valve distributing means effective between pump and motor permits constant communication of the pump effective pressure to the motor and comprises a spool type valve having a normal or relative neutral position. When the valve is disposed in the neutral position, no substantial fluid pressure differential is exerted on the power piston so as to affect the steered member. When, however, the spool valve is so moved from neutral position as to assume an off-center position, the steering mechanism is so constructed that pressure will be built up in the pressure fluid and forces will be differentially exerted on the piston in the fluid motor so as to cause the piston to actuate the steered member until such time as the spool valve is restored to its neutral position.

An object of the present invention is the provision of a concentrically arranged steering column and steering motor unit in which the location of the steering motor is axially spaced and separated from the locations of both the steering column and the load-connected steered element which is driven by the motor. A further object is the provision of such a concentrically arranged steering unit as just noted in which the steering motor is of the hydraulic type comprising a hollow working piston and a light control valve concentrically arranged therein, the piston being a double-acting piston and having hollow piston rods extending in opposite directions therefrom and with one such rod providing a hollow through which the control valve is operated, and the other providing a hollow through which the valve causes drain fluid to exhaust. An additional object is the provision of such a concentrically arranged and valved hydraulic steering unit, as above, in which each hollow piston rod passes through a surrounding lipped seal having the lip thereof extending always in the direction of movement of the rod whenever exposed to the substantial pressures of operation. Thus there is no tendency for the lips to be wedged against the moving rod and cause the seal to turn inside out and be extruded from the motor.

Another object of the invention is to provide a piston-type concentric power steering arrangement in which the power piston is physically disposed in spaced relationship between a manually operated steering element and a load-connected element steered thereby and in which the power piston is divorced from being subject to any lateral thrusts which might originate in either said steering or steered element. A further object is to provide such a piston-type concentric power steering arrangement, as just noted, in which the piston forms part of the physical structure mechanically interconnecting said steering and steered elements and at the same time the piston contains a small delicately balanced control valve, the piston being physically arranged, however, to bridge around and isolate the valve and provide a separate mechanical path for longitudinal thrust between steering and steered elements so as not to subject the valve to the same. An additional object is to provide such a piston-type concentric power steering arrangement having a piston-contained valve, as above, in which no external piping whatever is necessary between the valve itself and the ends of the piston to which the valve causes controlled pressure to be applied.

According to a feature of the present invention, a pump-supplied concentric power steering unit is provided in which a maximum of only three pieces of external piping is necessary, namely, a pressure pipe between the pump and the unit, a return pipe between the pump and the unit, and a seepage pipe, if desirable, provided between the pump and the unit.

Further features, objects, and advantages will either be specifically pointed out or become apparent when for a more complete understanding of the invention, reference is made to the following written description taken in conjunction with the accompanying drawings in which:

Figure 1 is a perspective view of a power-steered vehicle to which the invention is shown applied;

Figure 2 is a longitudinal plan view of the power steering unit of the vehicle of Figure 1;

Figure 3 is a longitudinal section in elevation taken along lines 3—3 of Figure 2;

Figure 4 is a transverse section taken along lines 4—4 of Figure 2;

Figure 5 is a fragmentary enlargement corresponding to Figure 3;

Figure 6 is a section taken along lines 6—6 in Figure 5;

Fig. 7 is a fragmentary enlargement of that portion of Fig. 3 containing the control valve.

In Figure 1 of the drawings, a steered vehicle illustrative of the general type to which the invention may be applied, is shown as having a steering wheel 10, a propulsion power plant 12, a body-supporting frame 14, and running gear for suspending the vehicle and including a pair of steerable front wheels 16 supported from a cross-member 18 forming a portion of the vehicle frame 14. Each of the pair of wheels 16 is incorporated in a so-called independent front suspension which is shown to include a set of one or more vertically spaced arms 22, a wheel spindle and knuckle support 20 articulately connected to the outer ends of the arms 22, a load spring 25 disposed between each of the lower arms 22 and the frame crossmember 18, and a steering arm 23 for each front wheel 16. Each of the steering arms 23 has an inwardly directed tie rod 24 connected thereto and the relatively inner ends of the tie rods 24 are pivotally connected to one arm of a bellcrank 28 pivotally supported to swing about a pivot 26 affixed to the frame front crossmember 18. A rearwardly extending drag link 30 is pivotally connected at the front to the other arm of the bellcrank 28 and is supported at its rear end by a pitman arm 32 splined to a transversely disposed rockshaft 34. It is through the rockshaft 34 and associated linkage just described, that the steering mechanism of the steered vehicle is connected to the pair of front wheels 16. A multi-section steering casing 36 is provided which has a longitudinal axis 37 and which is of generally longitudinally elongated shape between its respective lower and upper ends indicated at 38, 40. The lower end 38 of the casing 36 receives the rockshaft 34 journalled in bearings therein so as to be generally transversely arranged to and out of the plane of the longitudinal axis 37 of the casing 36. The upper end 40 of the casing 36 receives a steering-shaft-containing steering column 42 which is arranged concentrically therewith. The steering column 42 supports the steering wheel 10. An insulated support bracket 44 of general U-shape is provided so as to mount the casing 36 to the instrument panel and dash board structure of the vehicle, not shown. The multi-section casing 36 contains a valve-controlled piston which combines therewith to form a fluid-supplied power motor which is used in a power steering unit to apply power to operate the steering mechanism of the vehicle.

The power steering unit has a source of fluid pressure (and the pressures involved may be of the order of 600–800 p. s. i. above atmosphere at times) which is indicated at 62 and is positively driven by a pump shaft 64 flexibly coupled in tandem to a generator shaft 66 which drives the rotor of a generator 68. The propulsion power plant 12 selected for illustration in Figure 1 is a V–8 engine to which the generator 68 is mounted, and the engine includes a water pump shaft 70 which is belt-driven from the engine and has a sheave 72 keyed thereto. By means of a V belt 74, the sheave 72 is connected to a corresponding sheave on the generator shaft 66 and thus positively drives the pump shaft 64 at speeds directly proportional to engine speed. Thus as the speed of the power plant 12 varies, so varies the shaft speed of the generator 68 and so also varies the shaft speed of the drive shaft 64 for the source of pressure 62. The source of pressure 62 includes a reservoir from which a pump, appearing therebelow in outline, draws pressure fluid and pressurizes the same and then transmits the pressure fluid through a supply pipe 78 connected directly to the steering unit casing 36. The pressure system used herein is preferably of the re-circulating type and thus, a return line 80 is provided for returning the pressure fluid from the lower end 38 of the casing 36 to a filter containing inlet 76 to the reservoir of the pressure fluid source 62.

For a more complete understanding of the pressure fluid source 62, reference may be had to the source of pressure fluid similarly numbered 62 in the copending application Serial No. 271,187, filed February 12, 1952 in the name of William A. Hunter and assigned to the assignee of the present application. Such pressure fluid source 62 forms no per se part of the present invention, being separately disclosed and claimed in the noted copending application No. 271,187.

A seepage line 82 is provided between the upper end 40 of the casing 36 and the top of the reservoir tank at the source of pressure fluid 62.

In Figures 2, 3, and 4, the multi-section casing 36 is seen to comprise a one-piece lower casing part 84 and a one-piece upper part 86 which are secured together by a nut 88 having an inwardly directed flange at one end thereof, and a set of internal threads at the other end. The upper end 40 of the upper casing part 86 is received within a flare formed in the lower end of the steering column 42 and is held in place by a clamping band 90. The steering column 42 contains an impregnated fabric bearing 92 formed of anti-rattle material which slidably receives and journals a transmission ratio selector shaft 94 such that the shaft 94 is both rotationally and axially shiftable within the bearing 92. Concentrically arranged within the shaft 94 which is hollow, there is provided a steering shaft 96 which, while being rotatable in the same manner as the shaft 94, is nevertheless held firmly against any and all axial shift in the following fashion.

The shaft 96 has a shoulder 98 which is opposed in spaced relationship thereto by a nut 100 threadably received on the steering shaft 96. Surrounding the shaft 96 and received in the space between the shoulder 98 and the nut 100, a span of tapered roller bearings 102 is provided which holds the shaft 96 against any axial movement. A worm 104 is formed on the lower end of the steering shaft 96 and is received within a worm nut 106 which is arranged concentrically therewith. The lateral sides of the nut 106 are flat and engage a set of opposed flat inwardly directed cheeks 108 formed on the inner surface of the upper casing part 86 which provide a track way for the nut 106 and prevent any rotative motion of the latter. The nut 106 while being prevented from rotation by means of the cheeks 108, is nevertheless slidable longitudinally of the upper casing part 86. The outer and inner peripheries of the worm 104 and the nut 106 are provided with single pitch grooves 109 and 110 respectively, having corresponding pitch and containing a continuous series of balls 112. A return channel or ball conveyor is formed by boring a hole from one side of the nut 106 to an intersection with the thread of the nut at two spaced locations on the nut so as to span exactly 2½ of the single pitch threads thereof. These holes, one of which is indicated at 111, are counterbored to receive a ball conveyor which has a bore of such size as will permit the balls to pass radially therethrough and which is secured to the nut 106 by means of a bracket 113 and a set of screws 115. The ball conveyor comprises convenable semi-cylindrical sections 114, 116 and is so located in the bracket 113 that the sections are held in a companion mating relationship together. Each semi-cylindrical section 114, 116 has a lip on one extremity thereof which is seated in the groove 109 of the worm 104 and inclined forwardly so as to scoop up the balls out of the groove. The nut 106 is provided with a generally cylindrically-shaped depending portion 118 integral therewith.

The upper casing part 86 and the lower casing part 84 combine to provide a series of longitudinally successive chambers 120, 122, and 124. The chamber 120 disposed wholly within the upper casing part 86, serves as a seepage or fluid-collecting chamber which communicates directly with the reservoir of the pressure fluid source 62 by means of a seepage pipe 82. The chamber 124, which serves as a return fluid chamber, is separated by means of a transverse partition 126, from a working cylinder chamber 122 formed in the lower casing part 84. The working cylinder chamber 122 is in turn separated from the seepage collecting-chamber 120 formed in the upper casing part 86 by means of a transversely disposed partition 128 which necessarily has a spaced-apart relationship with respect to the transversely disposed partition 126. The transversely disposed partition 128 is secured in the bridging structure between the casing parts 84 and 86, and is held in place by means of the nut 88. Each of the spaced-apart transverse partitions 126, 128 contains a lipped seal 130, 132. Slidably received for reciprocative movement in the working cylinder 122 there is provided a double acting piston 134 having end structures 136, 138 providing a pair of oppositely extending hollow piston rods 140, 142 integral therewith. The hollow piston rod 142 contains a valve operating rod 144 connected at its inner end to a control valve 146 and threaded at its outer end 148 and threadably engaging a transverse wall 150 formed adjacent a transverse circumferentially extending slot 149 through the side of the cylindrical depending portion 118 in the nut 106. The extreme end of the threaded rod portion 148 is non-circular in cross section at 151 and is adjacent the tool opening or slot 149 so as to receive an adjusting tool by means of which the valve operating rod 144 is threadably adjusted with respect to the wall 150.

A lock nut 152 is received on the threads 148 for locking the valve operating rod relative to the depending portion of the nut 106. When the steering shaft 96 is rotated, the rotary motion thereof is converted into reciprocative motion of translation by means of the worm and nut 104, 106 and such motion of translation is in turn imparted to the hollow piston rod 142 and to the valve operating rod 144 as will now be set forth. The hollow piston rod 142 has a shoulder 154 which is opposed by a nut 156 threadably received on the end of the piston rod 142. In the space between the shoulder 154 and the nut 156, a pair of lost motion elements 158 is provided in surrounding relation to the hollow piston rod 142, being maintained in a spaced-apart relationship by means of a set of conical spring washers 162 so as to define an included gap 160. The outer periphery of the lost motion elements 158 is engaged by the depending portion of the nut 106, whereas the inner periphery of the lost motion elements 158 is engaged by the shoulder and nut 154, 156 aforesaid. Thus as the depending portion 118 of the nut 106 reciprocates in either direction, one or the other of the lost motion elements is moved against the opposition of the springs 162 in the direction of the other lost motion element so as to tend to close up the gap 160. If the reaction thrust of the hollow piston rod 142 happens to be substantial, the gap 160 is entirely closed up and a direct drive connection results between the depending nut portion 118 and the hollow piston rod 142. On the other hand, a direct drive connection is always present between the depending nut portion 118 and the valve operating rod 144 such that no lost motion is required to be taken up before the valve 146 responds in movement to motion of translation of the depending portion 118.

The present steering unit is designed with the purpose of providing a power assist action to the end that when the valve 146 is moved from its neutral position, a pressure differential is caused to be exerted across the double acting piston 134, and the piston is designed to move in the direction of the displacement of the valve 146. In the event of the failure of the pressure fluid system, a direct mechanical thrust is transmitted to the piston 134 by means of the hollow piston rod 142 and in such event the piston is likewise moved in a direction tending to follow movement of the valve 146. At all events, however, the motion of the piston 134 may be transmitted by means of the hollow piston rod 140 to the return chamber 124 in the bottom end 38 of the multi-section casing 36.

It will be noted that the lip seal 132 engages the outer surface of hollow piston rod 142 and is inclined in such a direction that when the pressure of fluid is exerted against the end structure 138 of the piston, the piston 134 and the pistod rod 142 so move as to urge the lip of the seal 132 in its own natural direction. That is to say, the only time that the piston rod 142 moves in a direction such as would tend to invert the lip of the seal 132 occurs when the fluid pressure against the end structure 138 of the piston is not the substantially high motivating force involved in the hydraulic system. Similarly, the lip of the lipped seal 130 is so directed as to be disposed in the natural direction of movement of the hollow piston rod 140 at all times during which a substantial fluid pressure is manifestly acting against the end structure 136 of the double acting piston 134. The hollow in the hollow piston rod 140 transmits return fluid from the valve 146 in a manner subsequently to be described and through an opening 174 formed in the hollow piston rod 140 so as to discharge the return fluid into the return chamber 124.

The rockshaft 34 to which the depending pitman arm 34 is splined, has a seal adjacent the pitman arm 32 and, at spaced-apart locations to the inside of the chamber 124, the rockshaft 34 is journalled in a set of transversely disposed bearings 164, 166. A countershaft 168 is disposed in a transverse position opposite to the rockshaft 34 and contained in the same transverse plane therewith. A peripherally grooved roller 170 is mounted on a set of needle bearings 172 which are supported by the countershaft 168 as a journal. A set of rack teeth 176 is provided on the end of the hollow piston rod 140 outwardly of the return opening 174 and the end of the piston rod 140 is of a generally semi-circular cross section. The rack teeth 176 are disposed in a plane which is in a non-parallel relationship to the axis of the counter shaft 168 with the result that the rack teeth 176 are slanted so as to be in an inclined or wedging relationship with respect to the part or parts immediately associated thereadjacent. The arcuate surface of the semi-circular end of the piston rod 140 is supportedly received in the peripheral groove of the roller 170 and lateral thrusts to which the rod 140 is subjected are taken up by reaction of the roller 170. The wedge-shaped rack teeth 176 are enmeshed with a set of helically arranged teeth formed on a sector 178 which is integral with the rockshaft 34.

The rockshaft 34 is shiftably adjustable along its own axis such that the sector teeth 178 and the rack teeth 176 may be wedged into close and intimate engagement with one another. The lower end 38 of the casing 36 has an end cover 180 secured to the casing by means of one or more screws 182 and the end cover 180 threadably receives a set screw 184 therethrough. The set screw 184 has an enlarged end which thrusts against the end of the rockshaft 34 to effect an adjustably tensioned engagement therewith. The set screw 184 is slotted at 186 to receive an adjusting tool, and the set screw has a lock nut 188 surrounding the end thereof.

In Figures 5, 6, and 7 the body portion of the piston 134 has the end structures 136, 138 individually fastened thereto by means of one or more bolts 190. Each end structure 136, 138 is peripherally grooved to receive a laminated piston ring structure 192 which sealingly engages the walls of the working cylinder 122. The body of the piston 134 has a main annular recess which is long enough axially of the piston to permit the supply pipe 78 always to be in communication therewith. The floor of the annular groove 194 at one end thereof has one or more radial passages 196 terminating therein which extend radially inwardly to a hollow interior 198 formed in the piston 134. The valve 146 having one or more longitudinally extending passages 200 therein which establish free communication throughout the interior 198 of the piston, is of the spool type and has end lands 202, 204 provided at the respective ends thereof. The land 202 is arranged so as to shift and cover an annular groove 206 formed in the piston structure which communicates pressure fluid to the end 136 of the piston. The valve land 204 is arranged to shift and cover an annular groove 208 formed in the piston structure which communicates pressure fluid to the end 138 of the piston. In the position shown in Figures 5 and 7 for the valve 146, the groove 206 is covered by the land 202 owing to the fact that the valve is shown shifted to a left hand position, but in the normal or neutral position, the land 202 slightly uncovers the annular groove 206 and the land 204 slightly uncovers the groove 208. In the actual physically constructed arrangement of the embodiment of the invention shown in Figure 5, the amount of this clearance in neutral position is made to be .005" at each end of the valve.

The spool valve 146 has a central land 210, and between the central land 210 and each end land 202, 204 there intervenes a communication-establishing recess. Adjacent the central land 210, an annular groove 212 and another annular groove 214 are provided in the interior 198 of the piston structure. The groove 212 communicates with and permits pressure fluid to escape from the end 138 of the piston and the groove 214 communicates with and permits the escape of pressure fluid from the end 136 of the piston. In the position shown in Figures 5 and 7, the groove 212 is closed and the groove 214 is open, but this fact is due to the valve 146 being shown in the left hand position as previously noted, whereas in neutral position each of the grooves 212, 214 is slightly uncovered by the land 210. Thus, when the valve 146 is in its neutral position, pressure fluid is continuously being circulated through the respective grooves and passages 206, 208 to, and through the respective passages and grooves 218, 220 from, the end faces 136, 138 of the piston against which the fluid pressure is effective to act. An annular chamber 216 is formed in the piston structure 146 and communicates with each of two annular grooves 218, 220 formed within the piston structure. The annular groove 218 is arranged with respect to the annular groove 212 such that when the valve land 210 uncovers the latter, the adjacent communication-establishing recess in the valve 146 establishes communication between the grooves 212, 218 so as to permit pressure fluid to discharge from the end face 138 of the piston and into the annular chamber 216 of the same. Likewise when the land 210 uncovers the annular groove 214, the adjacent communication-establishing recess in the valve 146 permits pressure fluid to pass from the end face 136 of the piston and through the annular groove 220 into the annular chamber 216 in the piston. The annular chamber 216 is connected by one or more longitudinally extending passages in the piston body to another annular chamber 222 which is formed in the piston end structure 136 and communicates with the interior of the hollow piston rod 140 by means of a plurality of radially extending piston passages 224 formed in the end structure 136 of the piston. Each radially extending passage 224 is plugged at its outer end by means of a plug 226. The valve operating rod 144 has a head 228 at the inner end thereof which thrusts against the end of the valve 146, and this thrust is opposed by a semi-spherically-ended spring-pressed plunger 230 at the opposite end of the valve 146. The thrust reaction of the spring of the spring-pressed plunger 230 is received in a cup 232 which is held in the end structure 136 of the piston. The valve operating rod 144 has a reduced section adjacent its head 228 which is received and held between a pair of bifurcations 234 formed at the end of the valve 146 and integrally incorporated therewith. The bifurcations 234 form a fork providing in effect a two-way thrust connection to the valve operating rod 144 for use in event that the valve becomes stuck such that the force of the spring-pressed plunger 230 is insufficient to overcome the sticking and move the valve.

The structure of the foregoing Figures 1–6 is constructed according to the principles of an "open valve" system having the characteristic that when the operating valve is in neutral position, the pressure fluid is split up into two proportionally divided paths such that one portion of the stream of fluid passes to one end of the double acting piston and from there to drain, and the other portion of the stream fluid passes to the opposite end of the piston and from there to drain. Under these conditions, no fluid horsepower is being lost in the wasted purpose of overcoming the back pressure of a valve and the pump pressure of the pressure source rises no higher than the pressure necessary merely than to overcome friction in the pipes and passages and circulate the fluid idly through the mechanism. It is particularly important that the neutral or central position of the valve 146 be exactly determined and pre-adjusted with respect to the center of the piston inasmuch as that when the fluid flow paths are disproportionately divided, a pressure differential tends to be built up across the piston which creates an unbalance causing or tending to cause piston movement. Such a centralized neutral position of the valve 146 may be very accurately determined and set owing to the fact that, following assembly of the structure shown in Figure 3, the nut 88 may be loosened and removed and then the entire upper casing part 86 may be shifted axially away from the lower casing part 84 so as to expose the non-circular portion 151 of the valve operating rod 144 to access for tool adjustment. Then, if the partition 128 is temporarily held in place and controlled gauge pressure is introduced through the pipe 78 and gauged discharge pressure is controlled and measured at the pipe 80, an exact neutral position of the valve 146 may be achieved by inserting a tool through the tool opening 149 and applying it to the non-circular portion 151 of the valve operating rod and causing axial shift of the valve operating rod 144 until such time as there is absolutely no tendency for piston movement when the steering shaft 96 and the rest of the steering elements are in a free, at-rest position.

It will be readily apparent that the piston 134 is not subject to any lateral thrusts which can originate in either the chamber 120 or in the chamber 124 due, for instance, to lateral thrust which the rockshaft 34 might tend to introduce into the latter. Hence there will be no tendency for the piston 134 to bind or to wear its sides or the piston rings therefor and the seals unduly. The normally arising lateral thrust imparted by the sector 178 is opposed by the peripherally grooved roller 170.

The operation of the steering unit of Figures 1–7 is as follows. When the operator rotates the steering wheel 10, the shaft 96 rotates in either a clockwise or counterclockwise direction, for instance, a direction in Figure 3 which corresponds to a downward movement of the nut 106 as in a right hand turn. The rotary movement of the shaft 96 is converted by means of the re-circulating type ball joint 104, 106 into translatory motion of reciprocation which immediately becomes manifest in similar movement of the valve operating rod 144 and the valve 146 in a direction downwardly with respect to the multi-section casing 36. At the same time the springs 162 separating the lost motion elements 158 are partially compressed so as to permit a part takeup the clearance of the gap 160. Normally, the response of the continuously moving pressure fluid is practically instantaneous with valve movement, and before any considerable amount of the gap 160 disappears, the valve 146 controlling the application of fluid pressure to the end 138 of the piston will create a pressure differential thereacross causing the piston to attempt to follow the valve in the movement of the latter. The valve 146 is at the same time permitting a greater clearance between the land 210 and the annular groove 214, as shown in Figures 5 and 7, so as to conduct a stream of pressure fluid away from the end 136 of the piston and through the drain chambers 216, 222 to the drain through the interior of the hollow piston rod 140. The hollow piston rod 140 moves with the piston 134 and by means of the rack teeth 176, thrusts against the sector 178 to cause a resulting power assisted movement of the pitman arm 32 and the front steering linkage. Such power assistance may amount to perhaps as much as 80% or more of the total steering effort necessary to turn the front wheels 16. In the ball joint formed by the worm and worm nut 104, 106, the right hand rotation of the steering shaft 96 causes the balls 110 to be circulated upwardly in the helical grooves and downwardly through the ball conveyor 114, 116 so as to be re-circulated into the helical grooves. During a left hand turn of the steering unit, the nut 106 tends to climb upwardly along the worm 104 and draw the valve 146 upwardly with respect to its surrounding piston to a position with respect to the neutral valve position, just opposite to that shown in Figure 5. In such instance, the controlled pressure fluid is applied against the end structure 136 of the piston, and the pressure fluid is allowed to escape from the end face 138 of the piston. In such case, the drain groove 214 for the end structure 136 is greatly restricted and the corresponding supply groove 206 for the end structure 136 of the piston is greatly enlarged. Also the supply groove 208 for the end 138 face of the piston is greatly restricted and the drain groove 212 therefor is greatly enlarged. The piston 134 accordingly, moves upwardly tending to follow the valve and causes the pitman arm 32 and the drag link 30 to move rearwardly relative to the vehicle.

As herein disclosed, the invention is shown in the environment of an open valve type system in which pressure fluid is being continuously circulated not only to the control valve, but also is being continuously circulated on past the control valve and through the chambers at each end of the piston. It is evident that the invention will be equally effective in pressure fluid systems of the open valve type in which there is a continuous communication maintained between the control valve and the source of pressure fluid and between the control valve and the ends of the piston, but in which the circulation is effective at all times between only the control valve and the pressure source. So also the drawing shows an hydraulic steering arrangement which may be described in operation as a mechanical "feel back" system, but indeed, it is not essential that mechanical feel-back be solely used or that hydraulic "feel back," affording a proportional feel available to the operator, be excluded from the system.

Variations within the spirit and scope of the invention described are equally comprehended by the foregoing description. In the claims, oil, glycerin and like liquids are not only comprehended by the term "fluid" but also other suitable fluids not necessarily in or confined to the liquid state.

What is claimed is:

1. In a pressure operated steering mechanism, an elongated casing having an intermediate working cylinder portion between the ends thereof, a two-ended double acting piston slidably received within said working cylinder having hollow piston rods mounted thereto and extending in opposite directions axially of said working cylinder, first and second spaced apart transverse partitions within the casing forming therewith a fluid containing chamber at each end of the working cylinder, one said partition having a lipped seal mounted thereto and slidably receiving one said piston rod in a manner such that the lip thereof extends in the direction of rod travel when said piston moves under influence of fluid pressure in the space between the piston and said first partition, passage means in said piston effective to exhaust the last said fluid pressure by communicating the same through the hollow interior of said one piston rod to one said fluid containing chamber as an incident to the causation of movement of said piston under influence of fluid pressure in the space between the piston and said second partition, said second partition having a lipped seal mounted thereto and slidably receiving the other said piston rod in a manner such that the lip thereof extends in the direction of rod travel when said piston moves under influence of fluid pressure in the space between the piston and said second partition, said passage means being also effective to exhaust fluid pressure in said last-named space by communicating the same through the hollow interior of said one piston rod to said one fluid containing chamber, valve means operatively interposed in the passage means so as to control the same, said valve means having a normally neutral position and being connected to a source of fluid pressure differing from atmosphere for constantly communicating fluid pressure to the opposite ends of the working cylinder, said valve means being shiftable in either direction from the neutral position for differentially controlling the application of fluid pressure to the ends of said piston, a valve operating rod slidably received in the other said hollow piston rod so as to have one end protruding therefrom and having the opposite end connected to said valve means for positionally operating the same, and a member having a first connection to said protruding end of the valve operating rod and a second connection to said other hollow piston rod said member being disposed concentrically with respect to said piston, said first connection being threadably adjustable for accurately centering the valve means and the passage means in said piston with respect to one another and said second connection comprising a spring-loaded lost motion connection permitting slight relative movement between said member and the other piston rod for said piston.

2. In power steering systems of the type having a steering column containing a steering shaft, a longitudinally elongated casing having an upper end rotatably receiving the steering shaft, a pair of spaced apart, transverse partitions formed in said casing intermediate the ends thereof forming therewith a working cylinder, a recirculating type ball joint in the upper end of said casing threadably engaging the steering shaft and having a depending portion, a hollow piston rod containing a shiftably arranged coaxial valve operating rod therein and extending from within said working cylinder through one said partition and to a location adjacent the depending portion of said ball joint, first and second means connecting the depending portion of said joint respectively to said piston rod and to said valve operating rod so as to provide two parallel mechanical paths into said working cylinder, said first means forming a lost motion connection and said second means forming a threadably adjustable connection, a double acting, passaged piston in said working cylinder containing a shiftable control valve concentrically arranged in the interior thereof, said piston and said valve being connected respectively to said hollow piston rod and to said valve operating rod, a second hollow piston rod connected to said piston extending through the other said partition and having an open-ended end, said valve having a normally neutral position and being connected to a source of fluid pressure differing from atmosphere for constantly communicating pressure fluid to the opposite ends of the piston, said valve being shiftable in either direction from the neutral position for effecting the unequal application of said fluid pressure to each end of the piston and being arranged to control the transfer of fluid at the same time between the other end of the piston and the lower end of the casing through said second hollow rod, the upper end of said casing being arranged to contain fluid substantially at atmospheric pressure.

3. In power systems of the type having a column containing a rotatable shaft, a longitudinally elongated casing having an upper end rotatably receiving the rotatable shaft, a pair of spaced apart, transverse partitions formed in said casing intermediate the ends thereof forming therewith a working cylinder, a recirculating type ball joint in the upper end of said casing threadably engaging the rotatable shaft and having a depending portion, a hollow piston rod containing a shiftably arranged coaxial valve operating rod therein and extending from within said working cylinder through one said partition and to a location adjacent the depending portion of said ball joint, first and second means connecting the depending portion of said ball joint respectively to said piston rod and to said valve operating rod so as to provide two parallel mechanical paths into said working cylinder, said first means forming a pre-loaded, spring centered lost motion connection and said second means forming a threadably adjustable connection, a double acting, passaged piston in said working cylinder containing a shiftable control element concentrically arranged in the interior thereof, said piston and said element being connected respectively to said hollow piston rod and to said valve operating rod, a second hollow piston rod connected to said piston and extending through the other said partition and having an open-ended end, said element having a normally neutral position and being connected to a source of fluid pressure differing from atmosphere for constantly communicating fluid pressure to the opposite ends of the piston, said control element constituting a valve shiftable in either direction from the neutral position for effecting the unequal application of said fluid pressure to each end of the piston and being arranged to control at the same time the fluid pressure exhausted from the other end of the piston and cause the same to be exhausted through said second hollow rod to the lower end of the casing.

4. In power systems of the type having a column containing a rotatable shaft, a longitudinally elongated casing having an upper end rotatably receiving the rotatable shaft, a pair of spaced apart, transverse partitions formed in said casing intermediate the ends of the latter forming therewith a working cylinder, a recirculating type ball joint in the upper end of said casing threadably engaging the rotatable shaft and having a depending portion, a hollow piston rod containing a shiftably arranged coaxial valve operating rod therein and extending from within said working cylinder through one said partition and to a location adjacent the depending portion of said ball joint, first and second means connecting the depending portion of said joint respectively to said piston rod and to said valve operating rod so as to provide two parallel mechanical paths into said working cylinder, said first means forming a lost motion connection and said second means forming a threadably adjustable connection, a double acting, passaged piston in said working cylinder containing a shiftable control element concentrically arranged in the interior thereof, said piston and said element being connected respectively to said hollow piston rod and to said valve operating rod, a second hollow piston rod connected to said piston extending through the other said partition and having an open-ended end, said element having a normally neutral position and being connected to a source of fluid pressure differing from atmosphere for constantly communicating fluid pressure to the opposite ends of the piston, said element constituting a valve shiftable in either direction from the neutral position for effecting the unequal application of fluid pressure to each end of said double-acting piston and being arranged to control at the same time the fluid pressure exhausted from the other end of the piston and cause the same to be exhausted to the lower end of the casing through said second hollow rod, the upper end of said casing being arranged to contain fluid substantially at atmospheric pressure, and a piston rod seal carried by each partition and having an axially extending lip slidably engaging the adjacent piston rod, the lip of each said seal being on the side thereof nearer the adjacent piston end so as to extend axially in the above described manner in the direction of motion of the piston rod engaged thereby, at all times of piston movement due to such applied pressure being exerted on the said adjacent end of the piston.

5. In power apparatus, an inclined casing of generally elongated shape between the ends thereof, a rotatable shaft concentric with respect to the casing and rotatably received in the upper end of the casing, said casing having means in a midportion thereof forming therewith a chamber providing a working cylinder, a double acting passaged piston reciprocable in said working cylinder and having hollow piston rods attached thereto and extending axially from said chamber in opposite directions, means toward the upper end of the casing for converting rotative motion from said shaft into motion of reciprocation and comprising a recirculating type ball joint threadably received on said shaft and having a depending portion, a control element concentrically arranged within the interior of said passaged piston, said element having a normally neutral position and being connected to a source of fluid pressure differing from atmosphere for constantly communicating fluid pressure to the ends of the piston, said element constituting a valve shiftable in either direction from the neutral position to effect the unequal application of said fluid pressure to each end of the piston and to control at the same time the fluid pressure exhausted from the other end of the piston and cause the same to be exhausted through said one hollow piston rod to the lower end of the casing, and an operating rod for said valve disposed within the hollow interior of the other said hollow piston rod, said ball joint depending portion having a first connection to said valve operating rod and having a second connection to said other hollow piston rod, one said connection being threadably adjustable and the other said connection being a spring-loaded lost motion connection.

6. In power steering apparatus, an inclined casing of generally elongated shape between the ends thereof, a steering shaft concentric with respect to the casing and rotatably received in the upper end thereof, said casing having means in a midportion thereof forming therewith a chamber providing a working cylinder, a double acting passaged piston reciprocable in said working cylinder and having hollow piston rods attached thereto and extending axially from said chamber in opposite directions, means toward the upper end of the casing for converting rotative motion from said steering shaft into motion of reciprocation and comprising a recirculating type ball joint threadably received on said shaft and having a depending portion, a control valve concentrically arranged within the interior of said passaged piston, said control valve having a normally neutral position and being connected to a source of fluid pressure differing from atmosphere for constantly communicating fluid pressure to the opposite ends with of said piston, said valve being shiftable in either direction from neutral position to effect the unequal application of said fluid pressure to each end of the piston and to control at the same time the fluid pressure exhausted from the other end of the piston and cause the same to be exhausted through said one hollow piston rod to the lower end of the casing, and an operating rod for said valve disposed within the hollow interior of the other said hollow piston rod, said ball joint depending portion having a first connection to said valve operating rod and having a second connection to said other hollow piston rod.

References Cited in the file of this patent

UNITED STATES PATENTS

| | | |
|---|---|---|
| 1,876,104 | Tucker | Sept. 6, 1932 |
| 1,908,144 | Gros | May 9, 1933 |
| 1,918,985 | Robson | July 18, 1933 |
| 1,937,485 | Davis | Nov. 28, 1933 |
| 1,944,700 | Tate | Jan. 23, 1934 |
| 1,959,177 | Sassen | May 15, 1934 |
| 1,987,505 | Edler | Jan. 8, 1935 |
| 2,050,421 | Charles | Aug. 11, 1936 |

FOREIGN PATENTS

| | | |
|---|---|---|
| 629,086 | Great Britain | Sept. 12, 1949 |